United States Patent
Töns et al.

(10) Patent No.: US 10,994,618 B2
(45) Date of Patent: May 4, 2021

(54) VEHICLE ELECTRICAL SYSTEM WITH INVERTER, ENERGY STORE, ELECTRICAL MACHINE AND AC TRANSMISSION TERMINAL

(71) Applicant: Continental Automotive GmbH, Hannover (DE)

(72) Inventors: Matthias Töns, Regensburg (DE); Martin Brüll, Barbing (DE); Martin Ehrmann, Nuremberg (DE); Hans-Peter Feustel, Roth (DE); Franz Pfeilschifter, Regensburg (DE)

(73) Assignee: Vitesco Technologies GmbH

( * ) Notice: Subject to any disclaimer, the term of this patent is extended or adjusted under 35 U.S.C. 154(b) by 343 days.

(21) Appl. No.: 16/307,263

(22) PCT Filed: May 31, 2017

(86) PCT No.: PCT/EP2017/063222
§ 371 (c)(1),
(2) Date: Dec. 5, 2018

(87) PCT Pub. No.: WO2017/211655
PCT Pub. Date: Dec. 14, 2017

(65) Prior Publication Data
US 2019/0255960 A1    Aug. 22, 2019

(30) Foreign Application Priority Data
Jun. 6, 2016    (DE) ..................... 10 2016 209 872.1

(51) Int. Cl.
*B60L 15/00*    (2006.01)
*B60L 50/60*    (2019.01)
(Continued)

(52) U.S. Cl.
CPC ............. *B60L 15/007* (2013.01); *B60L 50/60* (2019.02); *B60L 53/14* (2019.02); *B60L 53/24* (2019.02);
(Continued)

(58) Field of Classification Search
CPC ........... B60L 11/18; B60L 15/00; H02M 3/00; H02M 7/00
(Continued)

(56) References Cited

U.S. PATENT DOCUMENTS 5,076,643 A    12/1991 Colasanti et al.
5,135,282 A    8/1992 Pappers
(Continued)

FOREIGN PATENT DOCUMENTS

DE    102005014758 A1    10/2005
DE    102008063465 A1    6/2010
(Continued)

OTHER PUBLICATIONS

Non Final Office Action for U.S. Appl. No. 16/317,180, dated Apr. 2, 2020, 12 pages.
(Continued)

*Primary Examiner* — Bentsu Ro
(74) *Attorney, Agent, or Firm* — RatnerPrestia

(57) ABSTRACT

A vehicle electrical system is equipped with an inverter, an electrical energy store, an electrical machine and an AC transmission terminal. The inverter has a first and a second side and is configured to transmit power between these sides. The first side of the inverter is connected to the energy store via input current terminals of the inverter. The second side of the inverter is connected to the electrical machine via phase current terminals of the inverter. The inverter has at least two H-bridges. Each of the H-bridges bypasses the two (Continued)

sides of the inverter. The AC transmission terminal is connected to the second side of the inverter.

10 Claims, 3 Drawing Sheets

(51) Int. Cl.
    *B60L 53/14*     (2019.01)
    *B60L 53/24*     (2019.01)
    *H02M 7/5387*     (2007.01)
    *H02P 27/06*     (2006.01)

(52) U.S. Cl.
    CPC .......... *H02M 7/5387* (2013.01); *H02P 27/06* (2013.01); *B60L 2210/30* (2013.01); *B60L 2220/54* (2013.01); *B60L 2240/423* (2013.01); *Y02T 10/64* (2013.01); *Y02T 10/70* (2013.01); *Y02T 10/7072* (2013.01); *Y02T 10/72* (2013.01); *Y02T 90/12* (2013.01); *Y02T 90/14* (2013.01)

(58) Field of Classification Search
    USPC .......................................................... 318/560
    See application file for complete search history.

(56) References Cited

U.S. PATENT DOCUMENTS

| | | | |
|---|---|---|---|
| 5,332,954 A * | 7/1994 | Lankin | B60L 50/52 318/139 |
| 5,504,414 A | 4/1996 | Kinoshita | |
| 5,558,398 A | 9/1996 | Santos | |
| 5,561,595 A * | 10/1996 | Smith | H02M 7/5387 363/37 |
| 5,713,631 A | 2/1998 | O'Neill et al. | |
| 5,984,349 A | 11/1999 | Van Voorhies | |
| 6,126,152 A | 10/2000 | Santos et al. | |
| 6,129,419 A | 10/2000 | Neale | |
| 6,353,207 B1 | 3/2002 | Burt | |
| 6,608,401 B1 * | 8/2003 | Walter | H02M 5/458 307/39 |
| 7,088,595 B2 | 8/2006 | Nino | |
| 7,267,404 B2 | 9/2007 | Kern et al. | |
| 8,678,500 B2 | 3/2014 | Lem et al. | |
| 9,527,417 B2 | 12/2016 | Dry | |
| 9,550,439 B2 | 1/2017 | Dry | |
| 9,802,518 B2 | 10/2017 | Steinberger et al. | |
| 10,214,129 B2 | 2/2019 | Jaranson et al. | |
| 10,363,852 B2 | 7/2019 | Strumolo et al. | |
| 2003/0155813 A1 * | 8/2003 | Walter | H02M 5/458 307/31 |
| 2004/0097854 A1 | 5/2004 | Hester et al. | |
| 2005/0127853 A1 | 6/2005 | Su | |
| 2006/0217644 A1 | 9/2006 | Ozaki et al. | |
| 2009/0200970 A1 | 8/2009 | Kimura | |
| 2009/0219001 A1 | 9/2009 | Kimura | |
| 2010/0231173 A1 * | 9/2010 | Andrea | H02J 7/022 320/137 |
| 2011/0248563 A1 | 10/2011 | Komma et al. | |
| 2011/0316461 A1 | 12/2011 | Rippel | |
| 2013/0285426 A1 | 10/2013 | Arent et al. | |
| 2014/0042807 A1 | 2/2014 | Bouchez et al. | |
| 2014/0340039 A1 | 11/2014 | Lee et al. | |
| 2014/0368131 A1 | 12/2014 | Katsumata et al. | |
| 2015/0343911 A1 | 12/2015 | White et al. | |
| 2015/0357939 A1 * | 12/2015 | Choi | H02M 7/49 363/98 |
| 2015/0375629 A1 | 12/2015 | De Sousa et al. | |
| 2017/0231861 A1 | 8/2017 | Noso et al. | |
| 2018/0361897 A1 | 12/2018 | Lem et al. | |
| 2019/0135132 A1 * | 5/2019 | Brull | B60L 53/22 |

FOREIGN PATENT DOCUMENTS

| | | |
|---|---|---|
| DE | 102011075927 A1 | 11/2012 |
| EP | 0849112 A1 | 6/1998 |
| EP | 2500211 A2 | 9/2012 |
| JP | 5961402 A | 4/1984 |
| JP | 2002165370 A | 6/2002 |
| JP | 2011130571 A | 6/2011 |
| JP | 2011188601 A | 9/2011 |
| JP | 2012110121 A | 6/2012 |
| WO | 2010130607 A2 | 11/2010 |
| WO | 2011063006 A1 | 5/2011 |
| WO | 2015193003 A1 | 12/2015 |

OTHER PUBLICATIONS

Non Final Office Action for U.S. Appl. No. 1613 7,312, dated Jun. 4, 2020, 17 pages.
Final Office Action for U.S. Appl. No. 16/317.180, dated Jun. 19, 2020, 3 pages.
German Examination Report for German Application No. 10 2016 209 872.1, dated Sep. 28, 2020, 11 pages.
International Search Report and Written Opinion for International Application No. PCT/EP2017/063222, dated Aug. 11, 2017—7 pages.
German Examination Report for German Application No. 10 2016 209 872.1, dated Feb. 9, 2017—6 pages.
German Examination Report for German Application No. 10 2016 209 898.5, dated Feb. 13, 2017—7 pages.
International Search Report and Written Opinion for International Application No. PCT/EP2017/063227, dated Aug. 28, 2017—12 pages.
Notice of Allowance for U.S. Appl. No. 16/307,312, dated Jul. 21, 2020, 5 pages.

* cited by examiner

VEHICLE ELECTRICAL SYSTEM WITH INVERTER, ENERGY STORE, ELECTRICAL MACHINE AND AC TRANSMISSION TERMINAL

CROSS REFERENCE TO RELATED APPLICATIONS

This application is the U.S. National Phase Application of PCT International Application No. PCT/EP2017/063222, filed May 31, 2017, which claims priority to German Patent Application No. 10 2016 209 872.1, filed Jun. 6, 2016, the contents of such applications being incorporated by reference herein.

BACKGROUND OF THE INVENTION

Motor vehicles having an electrical drive, i.e. electric vehicles and hybrid vehicles, comprise an electrical energy store for supplying power to the electrical drive. Electric vehicles and plug-in hybrids are equipped with a terminal by means of which power can be transmitted from a stationary electrical supply system (local or public) to the energy store for the purpose of charging the latter. If need be, the vehicles are also equipped to feed electric power back to the supply system.

Transmitting electric power between supply system and vehicle requires power electronics components, in particular for controlling the transmission of power.

SUMMARY OF THE INVENTION

An aspect of the invention aims to demonstrate a possibility that enables the complexity of such components to be reduced.

There is provision for the transmission of an AC current to or from the vehicle electrical system (of a motor vehicle as described at the outset) to involve the use of components of an inverter. The inverter has a first and a second side. The inverter is configured to transmit power between these sides, in particular bidirectionally. The first side is connected to a (DC) energy store, in particular via a positive and a negative input current terminal of the inverter. The first side can be regarded as the DC side of the inverter. The second side of the inverter is connected to an electrical machine or the phases thereof, in particular via phase current terminals of the inverter. The inverter has at least 2 H-bridges that bypass the two sides (i.e. the first and second sides of the inverter). One portion of each bridge can be assigned to the first side and one portion of each bridge can be assigned to the second side. The H-bridge connects the two sides to one another in a series circuit. In particular, each H-bridge can have a respective parallel path for each of the two sides. This parallel path can also be referred to as an arm. Each parallel path or arm connects the two input current terminals by means of (controllable) switches. A connection between the arms or parallel paths (in particular comprising a series inductance) connects the two sides of the inverter. The AC transmission terminal is connected to the second side of the inverter, in particular to the second side or to sections of H-bridges associated with the second side. The AC transmission terminal may be connected to the phase current terminals (of the second side) of the inverter or to the parallel paths of at least two H-bridges, the parallel paths being in the second side of the inverter. The AC transmission terminal may in particular be connected to the sides of the inductances of the bridges, this relating to the sides of the inductances that are in the second side or that are connected to an arm associated with the second side (and also located there). The H-bridges of the inverter can each have two arms. These connect the positive input current terminal to the negative input current terminal by means of two series semiconductor switches. The two series semiconductor switches are therefore connected in parallel with the two input current terminals. The semiconductor switches of each arm are connected to one another at connecting points. The two connecting points of each H-bridge are connected to one another by means of an inductance.

The AC transmission terminal (for example a plug-in connection or a vehicle-based apparatus for inductive power transmission) may be connected to that (second) side of the inverter that faces the electrical machine, in particular to at least one phase current terminal of the inverter or to another connection point, which is in the second side of the inverter. The AC transmission terminal may be connected to phase current terminals of the inverter directly, or may be connected to the inverter via an electrical machine (of the electrical drive of the vehicle) connected to phase current terminals. The connection between AC transmission terminal and the inverter or the second side thereof, in particular between AC transmission terminal and (at least one) phase current terminal, may therefore be provided directly or indirectly via the electrical machine.

As a result, a vehicle can be charged directly by an AC electrical system or can deliver power directly thereto. A stationary rectifier is therefore not necessary. Rather, the function thereof is performed by the inverter. The power electronics already present in the form of the inverter, which in particular provides the phase currents for the electrical machine, is also used in this instance for controlling the power (in particular the current and/or the voltage) transmitted via the AC transmission terminal. In particular a further voltage transformer is not absolutely necessary for matching to the voltage of the energy store.

The inverter comprises H-bridge circuits. These are connected between the electrical energy store and the phase current terminals. This allows operation of the inverter to convert between the DC voltage of the energy store and the phase voltages of the phase terminals (i.e. of the electrical machine). The term "inverter" is also derived from this manner of operation, other manners of operation, for example rectification of AC charging voltage for supply to the energy store, also being possible, even if they are not taken into consideration when coining the term. The H-bridges further allow conversion between the AC voltage at the AC transmission terminal and the DC voltage of the energy store. This in particular relates to the type of current and the level of current.

As mentioned, the vehicle electrical system described here is equipped with an inverter, an electrical energy store, an electrical machine and an AC transmission terminal. The inverter comprises semiconductor power switches (controllable by means of control signal). The topology of the inverter and the connection thereof within the on-board electrical system is depicted below. The electrical energy store is in particular a storage battery, for example a lithium-based storage battery. The electrical energy store may be a traction storage battery. The energy store can have a rated voltage of 40-60 V, in particular of 48 V, and can in particular have a rated voltage of more than 100 volts, in particular of at least 200 or 300 V, for example of 350-420 V. The energy store may be a high-voltage storage battery. The electrical machine is in particular a three-phase machine. The electrical machine may be a separately excited or permanent-magnet electrical machine. The AC transmission terminal can comprise a plug-in inlet, i.e. an electromechanical plug connection element that can be fitted in the outer skin of a vehicle. The AC transmission terminal is configured to be connected to a charging plug (or more generally: connector).

The inverter is controllable and comprises controllable H-bridges. The inverter has a positive input current terminal and a negative input current terminal. The term input current terminal is obtained from the inverter mode in which the inverter receives power from the energy store. In this mode, the inverter receives power via the input current terminal, which means that in this mode this terminal is used as the input of the inverter. In the charging mode, the same terminals are used for delivering power to the energy store, i.e. as the output of the inverter.

The input current terminals are connected to the energy store. An intermediate circuit capacitor may be connected in parallel with the energy store or in parallel with the input terminals of the inverter.

The inverter has at least two phase current terminals connected to the electrical machine. In particular, the inverter has phase current terminals in a number corresponding to the number of phases of the electrical machine. Each of the phase current terminals may be connected to a separate phase of the electrical machine. By way of example, the inverter has three (or six) phase current terminals, each connected to one of three (or six) phases of the electrical machine.

The inverter has a first side and a second side. The inverter is configured to transmit power between these sides. The first side of the inverter is connected to the energy store, in particular via a positive and a negative input current terminal of the inverter. The second side of the inverter is connected to the electrical machine, in particular via at least two phase current terminals of the inverter.

The inverter has at least two H-bridges. The H-bridges bypass the two sides. One section of each H-bridge (in particular one arm of the two arms) is part of the first side and a further section of each H-bridge (in particular the other of the two arms) is part of the second side. The H-bridges are each connected between the input current terminals and the phase current terminals. The H-bridges are connected in series between the input current terminals and the phase current terminals. The H-bridges are connected in parallel with one another (at least in respect of the input current terminals). The H-bridges are individually connected to individual phases of the electrical machine.

Each H-bridge comprises two arms. A first of these arms (located in the first side) connects the two input current terminals. A second of these arms (located in the second side) connects an input current terminal (in particular the negative input current terminal) and a phase current terminal. Each arm comprises two switching elements connected to one another via a connecting point. The two connecting points of each H-bridge (i.e. the connecting point of one arm and the connecting point of the other arm of the same H-bridge) are connected to one another via an inductance.

The switching elements, in particular semiconductor switches, of each arm are connected to one another at connecting points. The two connecting points of each H-bridge are connected to one another by means of an inductance. The inductance is in particular configured as a discrete component, for example as a coil having a core. The inductance has a first terminal or a first side, which is associated with the first side. The inductance has a second terminal or a second side, which is associated with the second side. The first terminal of the inductance is connected to a connecting point of an arm of the first side. The second terminal of the inductance is connected to a connecting point of an arm of the second side. This applies in particular for all the H-bridges of the inverter.

As mentioned, the H-bridges of the inverter can each have two arms. These connect the positive input current terminal to the negative input current terminal by means of two series semiconductor switches. The semiconductor switches are preferably transistors, in particular field-effect or bipolar transistors, for example MOSFETs or IGBTs.

Each phase current terminal may be connected to an input current terminal (in particular to the negative input current terminal) via a capacitor. In other words, each H-bridge can have a capacitor connected in parallel with the second arm (i.e. arm of the second side of the inverter).

There is provision for the AC transmission terminal to be connected to the inverter, in particular to be connected to the second side of the AC transmission terminal. The AC transmission terminal has at least two phases and preferably has three phases or is equipped with more than three phases. The AC transmission terminal is in particular a three-phase terminal. The connection between the AC transmission terminal and the inverter (or the second side thereof) preferably has a number of phases corresponding to the number of phases of the electrical machine or of the phase terminals of the inverter. The number of phases of the cited connection or the number of phases of the AC transmission terminal can in particular correspond to the number of H-bridges of the inverter. Alternatively, the number of phases of the AC transmission terminal or of the connection may be smaller than the number of phases of the second side of the inverter or may be smaller than the number of H-bridges of the inverter.

The AC transmission terminal (or the connection) can be used to supply power to the electrical energy store via the inverter. In particular, the AC transmission terminal may be connected to at least one of the phase current terminals (or to all of them) in a direct or indirect manner. In particular, the connection between AC transmission terminal and the inverter (or the second side thereof) comprises no voltage or current transformer. The connection between AC transmission terminal and (at least one) phase current terminal can have a filter and/or safety elements such as a fuse and/or an isolator switch.

The AC transmission terminal may be connected to at least one of the phase current terminals (or other components of the second side of the inverter) directly. Further, the AC transmission terminal may be connected to at least one of the phase current terminals (or other components of the second side of the inverter) indirectly via the electrical machine. The AC transmission terminal may therefore be connected to the inverter directly or indirectly (namely via the electrical machine). "Connected directly" thus denotes a connection that comprises no electrical machine or no windings of an electrical machine. "Connected directly" thus denotes a connection that has no circuit for voltage or current transformation. "Connected directly" can denote a connection that has a filter and/or safety elements such as a fuse and/or an isolator switch. "Connected indirectly" can denote a connection that comprises an electrical machine or a winding of an electrical machine (for example in a series circuit). In the case of direct connection, the voltage at the energy store can be matched to the AC voltage at the AC transmission terminal. In particular, a DC booster is not necessary. In the case of an indirect connection, AC current charging and DC current charging can be combined (at the same time). In particular, a DC current transmission terminal can be connected to (two) phase terminals of the inverter, as a result of which AC current and DC current charging can be performed (at the same time).

The AC transmission terminal may be connected to the phase current terminals (or to the inverter or the second side thereof) directly. The phase current terminals or, generally, the inverter or the second side thereof may be connected to the electrical machine via an isolator switch. This isolator switch is used to disconnect the electrical machine from the inverter, in particular in the charging mode or in the feedback mode.

Alternatively or in combination therewith, an isolator switch may be provided that is provided between windings of the electrical machine. The latter isolator switch is used for controllable defeat of the interconnection configuration of the windings, in particular of a star or delta configuration, in particular in the charging mode or in the feedback mode. There may thus be an isolator switch such as the latter provided between phase windings of the electrical machine (in connections between the phase windings of the electrical machine itself). The isolator switch may be configured to connect the windings or the ends thereof to a common star point of the electrical machine in a first state and to provide the connection of the windings in isolation from one another in a second state.

Such an isolator switch may be configured to defeat a star interconnection (or delta interconnection) at least in part. The isolator switch may be provided as a switch that disconnects at least one phase winding (of the electrical machine) connected to the AC transmission terminal from other phase windings. The switch may further be provided to disconnect all the phase windings from a star point of the electrical machine or all the phase windings from one another in controlled fashion. Preferably, the switch is configured to disconnect only some of the phase windings from a star point of the electrical machine or only some of the phase windings from one another in controlled fashion, while the other phase windings remain connected.

The AC transmission terminal may, as mentioned, be connected to the phase current terminals or to the inverter indirectly (i.e. via the electrical machine).

The AC transmission terminal may be connected to the electrical machine or the windings thereof via a changeover switch. The changeover switch is connected in order to connect the electrical machine or the windings thereof to one another in a first state. In the first state, the windings are connected to a common star point of the electrical machine, for example, or the windings are connected to one another in series, i.e. are provided in delta configuration. In this switching state, a star configuration of the electrical machine can result in one end of each of the windings being connected to one another, i.e. the electrical machine may be present in star configuration. Further, in this switching state, the windings may be arranged in a row as in a delta configuration. In a second switching state, the windings are connected to the AC transmission terminal. In the second switching state, one end of each of the windings is connected to the AC transmission terminal. The windings or the electric machine are or is connected in series between the inverter (i.e. the second side thereof or the phase terminals) and the AC transmission terminal. The changeover switch can have n−1 individual changeover elements, n being the number of phases or the number of windings of the electrical machine. A phase or a winding of the electrical machine may thus be connected to the AC transmission terminal directly, all other phases or windings being connected to the AC transmission terminal via individual changeover elements. The changeover switch is configured firstly to open the connections between the windings (for example the star point or the delta configuration) and secondly to connect (one end of) the windings to the AC transmission terminal in the second switching state.

The H-bridges of the inverter can have an arm on each of the first and second sides of the inverter. These arms connect the positive input current terminal to the negative input current terminal by means of two series semiconductor switches. Each arm preferably comprises two series (controllable) semiconductor switches. Each arm is connected in parallel with the energy store or with the input current terminals. The two semiconductor switches of each arm are connected via a connecting point. The AC transmission terminal may be connected to the connecting points of those arms that are on the second side. In other words, the AC transmission terminal may be connected to the connecting points of those arms that are connected to the electric machine or the phase terminals or that are on the side of the inverter that is opposite the input current terminals. An additional isolator switch (cf. the isolator switches T, T' or the changeover switch T" in FIGS. 1-3) are then not necessary and can be omitted or replaced by continuous connections.

The vehicle electrical system can further have a DC transmission terminal. This has a positive and a negative rail (or a negative and a positive connection point). The positive rail may be connected to one of the phase terminals, to multiple phase terminals or to all the phase terminals. In particular if the positive rail is connected to multiple phase terminals or to all the phase terminals, a polyphase isolator switch may be provided between the DC transmission terminal and the relevant phase terminals. Said isolator switch may be closed (by means of a control unit) in the charging mode and in the feedback mode and may be open in the recovery mode and in the inversion mode (in which the electrical machine is powered by the inverter), in order to provide the phase terminals in electrical isolation. Further, the positive rail may be connected to the inverter or the phase terminals thereof via the electrical machine. A selector switch may be provided that connects either the DC transmission terminal or the AC transmission terminal to the inverter (directly or via the electrical machine). An isolator switch may further be connected downstream of the DC transmission terminal and/or the AC transmission terminal, wherein a control unit controlling said isolator switch is configured to disconnect the DC transmission terminal in an AC charging mode and in an AC feedback mode and to disconnect the AC transmission terminal in a DC charging mode and in a DC feedback mode.

The negative rail may be connected to another of the phase terminals (if not connected to the positive rail) or to the negative input terminal.

A control unit (for example the aforementioned control unit) may be provided that actuates the inverter. The control unit is connected to the inverter for the purposes of actuation. In an inversion mode of the control unit, the inverter is actuated to produce phase voltages present at the phase terminals from the DC voltage of the energy store. In an (optional) recovery mode, the control unit actuates the inverter to produce a charging voltage at the energy store from the phase voltages at the phase terminals. In an (AC) charging mode, the control unit actuates the inverter to produce a charging voltage at the energy store from the voltage present at the AC transmission terminal. In this instance, the AC voltage present at the AC transmission terminal is converted, or rectified, into a DC voltage of the energy store. In an (optional) (AC) feedback mode, the control unit actuates the inverter to produce an (AC) feedback voltage at the AC transmission terminal from the voltage present at the energy store of the vehicle electrical system. In a DC charging mode, the control unit actuates the inverter to produce a charging voltage at the energy store from the voltage present at the DC transmission terminal. In this instance, the DC voltage present at the DC transmission terminal is matched to a voltage level of the energy store. In an (optional) DC feedback mode, the control unit actuates the inverter to produce a DC feedback voltage at the DC transmission terminal from the voltage present at the energy store of the vehicle electrical system. It should once again be mentioned that, for the sake of better clarity, the term "inverter" is determined on the basis of only one function, which is performed during the inversion mode. As mentioned, the inverter has other functions or modes not taken into consideration when coining the term. The inverter is thus not restricted to a circuit configured exclusively for inverting the voltage of the energy store.

The charging voltage at the energy store can be prescribed by a battery management system of the energy store or by a recovery controller as a setpoint value. Instead of a charging voltage, it is also possible for a charging current or a charging power to be prescribed as the setpoint value. The phase voltages can be prescribed by a (superordinate) motor controller of the electrical machine, either directly as a voltage setpoint value or as a power or torque requirement. Instead of phase voltages, it is also possible for phase currents, as mentioned, to be used for control. The feedback voltage can be detected as a setpoint value by a reception device of the vehicle electrical system. The reception device may be configured to receive setpoint values from a stationary controller. Instead of a feedback voltage, it is also possible for a feedback current or a feedback power to be prescribed.

The control unit may be configured to actuate at least one of the aforementioned isolator switches, changeover switches and/or selector switches. The control unit may further be configured to keep the isolator switch in the charging mode or in the feedback mode in the open state. The control unit may further be configured to keep the isolator switch in the inverter mode or in the recovery mode in the closed state.

The control unit may further be configured so as, in the event of a fault, to open switches in all the bridges of the inverter, for example if a charging fault or a feedback fault occurs and charging or feedback is intended to be interrupted.

A detent may be provided in order to stop the electric machine (i.e. in order to prevent rotation). The control unit may be configured to actuate the detent. The control unit may in particular be configured to stop the detent in the charging mode and if need be in the feedback mode and not to stop the detent in the inverter mode and if need be in the recovery mode.

If a DC transmission terminal is provided, it is possible for the positive rail thereof to be connected to multiple or preferably all phase current terminals directly or via a switch. In other words, the DC transmission terminal is connected to the phase current terminals, preferably all of them, directly or via a switch. As a result, multiple or all H-bridges can be used in the charging mode or in the feedback mode. The DC transmission terminal has a negative rail connected to the negative input current terminal of the inverter. If a switch is used, then it preferably has multiple polyphases. The switch has a switch element or a phase for each connection between a phase terminal and the positive rail (in the case of a polyphase switch). The control unit is configured to keep the switch in an open state in the inverter mode or if need be in the recovery mode. The control unit is further configured to keep the switch in a closed state in the charging mode or if need be in the feedback mode.

Instead of connecting the positive rail to the phase terminals of the inverter, as described above, the positive rail may also be connected to the phase terminals of the inverter via the electrical machine or via the phase windings thereof. In other words, the positive rail may be connected to the phase current terminals indirectly via the electrical machine. In this instance, the phase windings are connected in series between the positive rail and the inverter. The negative rail of the DC transmission terminal may be connected to the negative input current terminal of the inverter. As mentioned, the term "positive rail" (referenced to the DC transmission terminal) can preferably be replaced with "positive contact" in all the variants described here and the term "negative rail" can be replaced with "negative contact".

The vehicle electrical system is in particular the on-board electrical system of a plug-in hybrid motor vehicle or of an electric motor vehicle.

BRIEF DESCRIPTION OF THE DRAWINGS

FIGS. 1, 2 and 3 each show a vehicle electrical system having an energy store ES and an electrical machine EM connected to one another via an inverter WR. An AC transmission terminal AC (in FIG. 1 connected to an "AC charger", i.e. an AC charging station, outside the vehicle electrical system) is connected to the inverter WR.

DETAILED DESCRIPTION OF THE PREFERRED EMBODIMENTS

Figure 1:
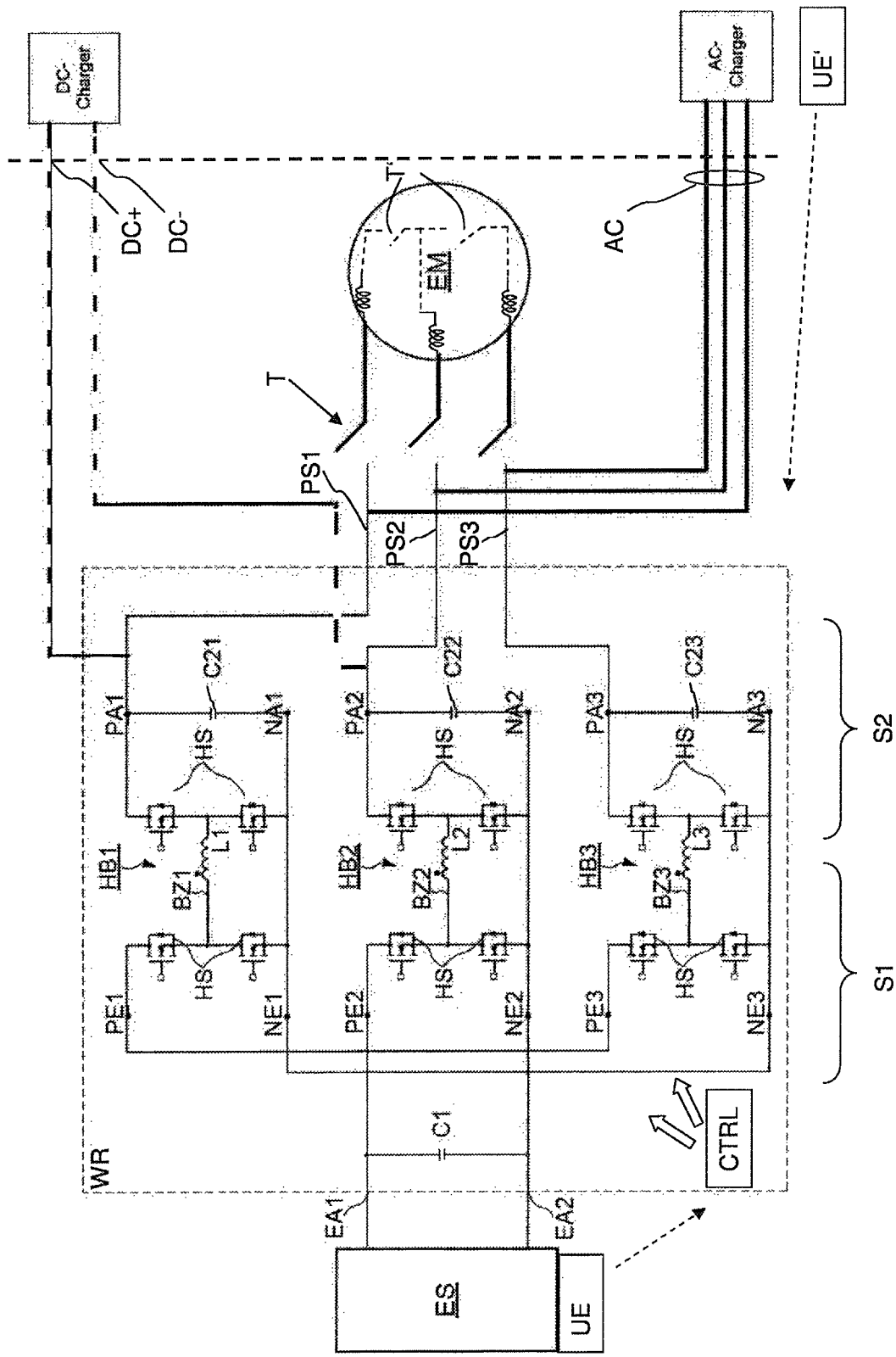
FIGS. 1-3 serve to explain the on-board electrical system described here in more detail and show exemplary vehicle electrical systems.
Figure 2:
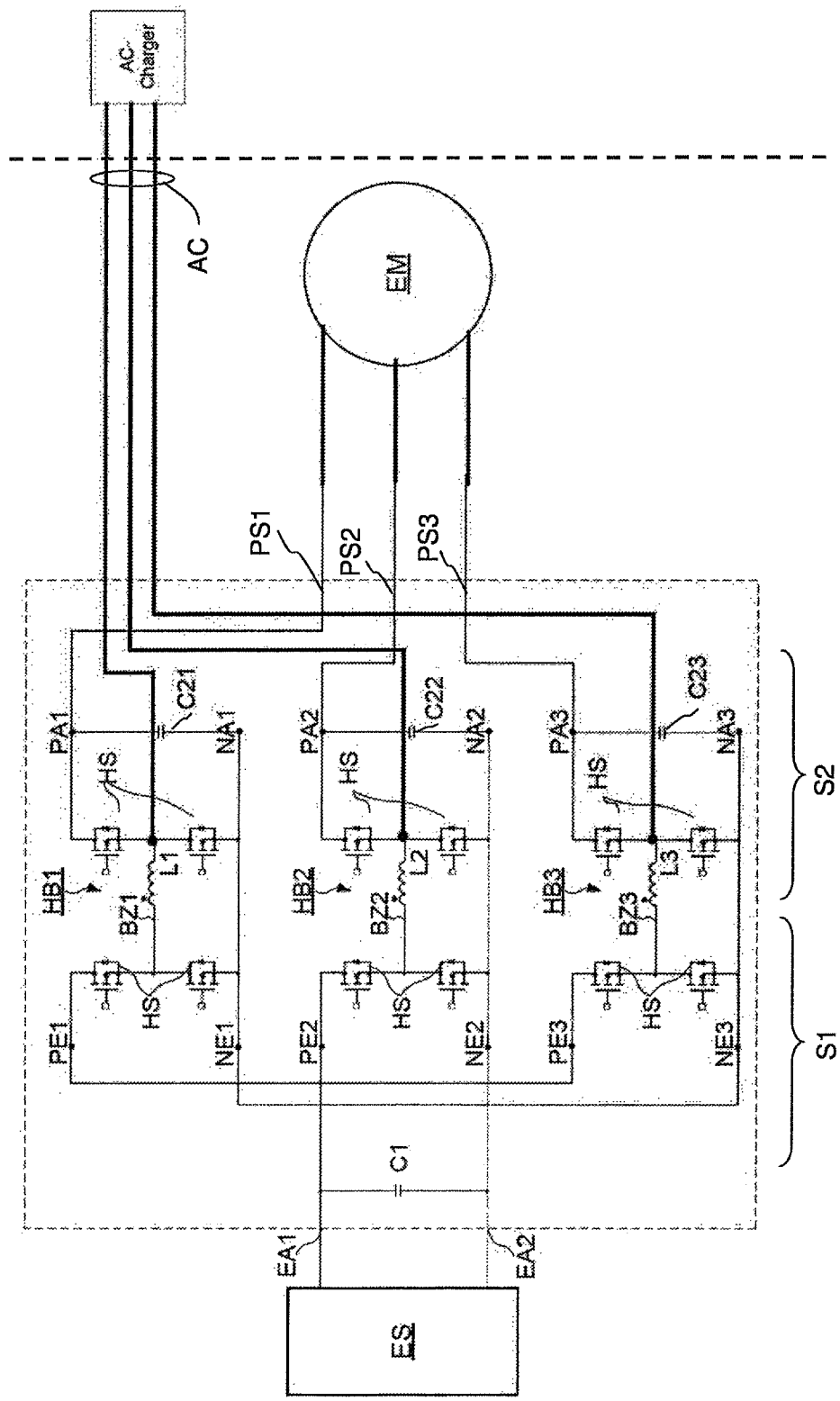
Figure 3:
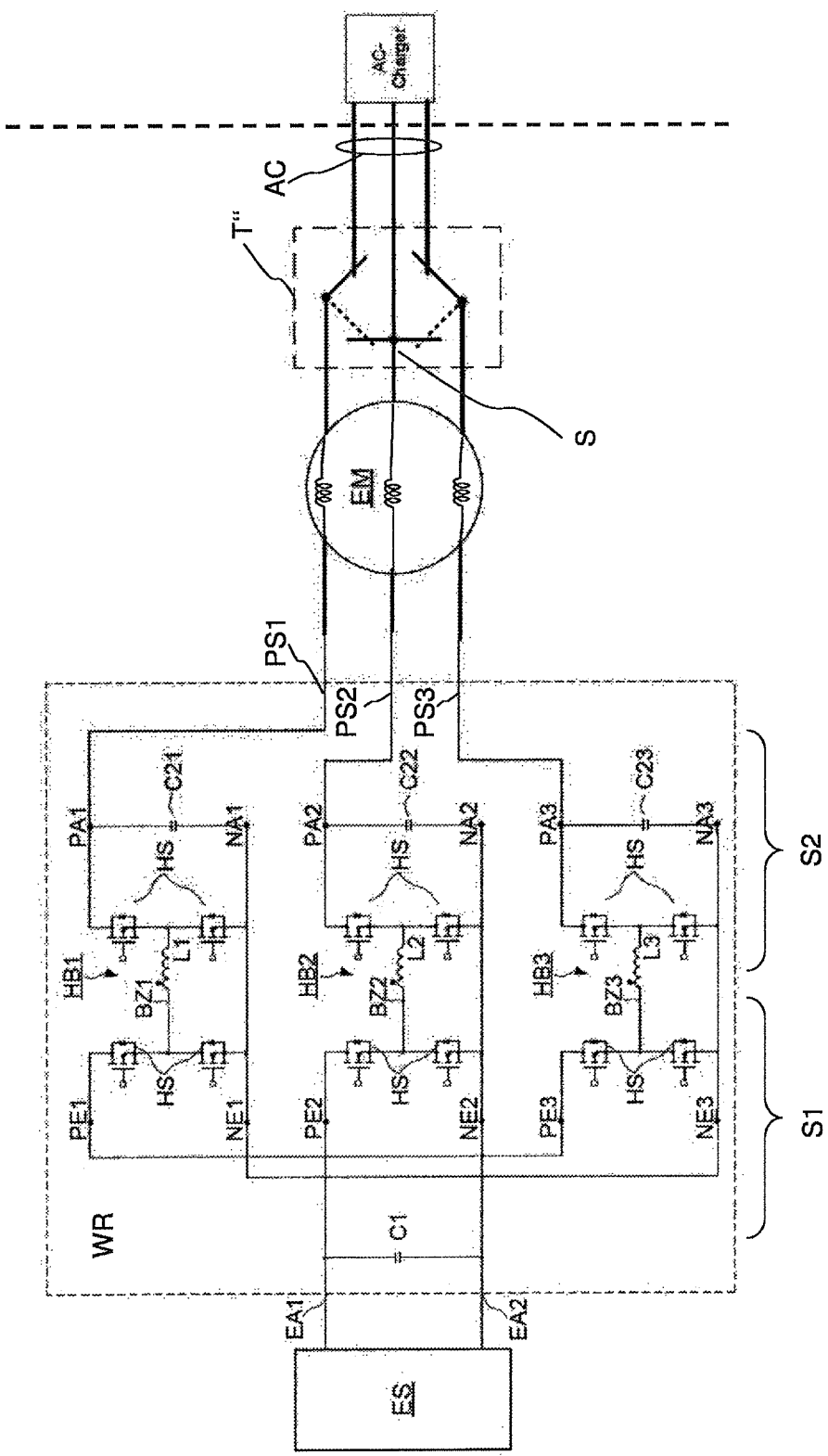

In FIGS. 1, 2 and 3, the energy store ES is connected to the inverter WR via a positive input current terminal EA1 and a negative input current terminal EA2 thereof. Connected in parallel with the input current terminals EA1, EA2 is an intermediate circuit capacitor C1. The inverter WR comprises three H-bridges HB1-HB3. The H-bridge HB1 has a positive input PE1 and a negative input NE1. The H-bridge HB2 has a positive input PE2 and a negative input NE2. The H-bridge HB3 has a positive input PE3 and a negative input NE3. The positive inputs PE1-3 are connected to one another and further connected to the positive input terminal EA1 of the inverter WR. The negative inputs NE1-3 are connected to one another and further connected to the negative input terminal EA2 of the inverter WR. Each H-bridge HB1-3 has two arms, each having two series-connected semiconductor switches HS. A first of the arms of each H-bridge (depicted on the left) connects the respective negative input and positive input of the respective H-bridge HB1-3. Each H-bridge has a negative output NA1-3 and a positive output PA1-3. In each H-bridge, a second of the arms connects the outputs PA1, NA1; PA2, NA2 and PA3, NA3. Each arm has two semiconductor switches HS connected to one another in series via a connecting point. For each H-bridge HB1-3, it holds that the connecting points of the two arms are connected to one another by means of a bridge path BZ1-3. The bridge path BZ1-3 connecting the connecting points of the two arms in each H-bridge HB1-3 has a series-connected inductance L1-3. In other words, the inductance L1-3 connects the connecting points of the semiconductor switches HS of the two arms in each of the H-bridges HB1-3. Each phase terminal is connected to the negative input current terminal EA2 and to the negative inputs NE1-3 of the H-bridges HB1-3 via a capacitor C21-23. The positive outputs PA1-PA3 of the H-bridges HB1-HB3 correspond to phase current terminals of the inverter WR. For this reason, the positive outputs PA1-PA3 of the H-bridges HB1-3 and the phase current terminals PS1-3 of the inverter WR can be regarded as equivalent to one another. The inverter has a first side S1 and a second side S2. The first side S1 is connected to the energy store ES and comprises the input current terminals EA1 and EA2. The second side S2 of the inverter WR is connected to the electrical machine EM, in particular via at least two phase current terminals PS1-3 of the inverter WR. A dashed line depicts the interface between vehicle electrical system and stationary devices (DC charger and AC charger). At this interface, there are the DC transmission terminal and possibly the AC transmission terminal. Depicted to the left of the dashed line is the vehicle electrical system described here.

Now that common aspects of FIGS. 1-3 have been mentioned, principal differences between FIGS. 1-3 are discussed subsequently:

In the circuit of FIG. 1, the AC terminal AC is connected to the phase terminals PS1-3 (directly). The AC voltage present at the AC terminal AC is supplied on the second side S2 of the inverter WR, in particular via the phase terminals PA1-3. The depicted phase terminals PA1-3 form a three-phase system, and the depicted AC terminal AC is also in three-phase form. An optional DC transmission terminal (connection to the inverter depicted in dashes) having a positive rail DC+ and a negative rail DC− may be connected to two phase terminals. The depiction shows that the positive rail DC+ is connected to the phase terminal PA1 and the negative rail DC− is connected to the phase terminal PA2. The optional DC transmission terminal is connected to the second side of the inverter WR. Power is transmitted either via the DC transmission terminal DC+, DC− or via the AC transmission terminal AC.

In the circuit in FIG. 2, AC current is likewise transmitted to the second side S2 of the inverter via the AC transmission terminal AC. The AC transmission terminal AC is not connected to the phase terminals PA1-PA3 directly (see FIG. 1), however, but rather is connected to connecting points of semiconductor switches HS of arms of the H-bridges HB1-3. This relates to the arms of the H-bridges HB1-3 that are on the second side of the inverter, in particular the arms connected to the phase terminals PA1-3 directly.

In FIG. 3, the AC transmission terminal AC is connected to the phase terminals PS1-3 via the electrical machine EM. The AC voltage present at the AC terminal AC is supplied, in particular via the phase terminals PS1-3, on the second side S2 of the inverter WR via the electrical machine EM, the windings of which are connected in series between the AC transmission terminal AC and the inverter WR. A changeover switch T' selectively either connects the windings in star configuration or produces an open configuration for the windings in which they have multiple phases connected to the polyphase AC transmission terminal AC. In the open configuration, the windings are not connected to one another, but rather the phases of the electrical machine EM are electrically isolated from one another and, as isolated elements, connected in each phase in series between the individual phase terminals of the polyphase AC transmission terminal AC and the phase terminals PS1-3 of the inverter WR.

Now that some differences between the circuits of FIGS. 1-3 have been depicted, FIGS. 1-3 are described in more detail.

In FIG. 1, the AC transmission terminal AC is (has three phases) connected to the three phase terminals PS1-3 of the inverter WR. The depiction shows the individual phases of the connections. An isolator switch T is depicted, which has multiple phases and isolates the individual phase windings of the electrical machine EM (or the electrical machine EM itself) from the phase current terminals PS1-3 of the inverter WR. The isolator switch T therefore controllably isolates the electrical machine EM from the inverter WR. Alternatively, an isolator switch T' inside the electrical machine EM can be used that breaks the phase windings of the electrical machine EM (for example in star configuration). The isolator switch T' therefore opens the star configuration of the electrical machine EM when said switch is in the open state. If power is transmitted via one of the transmission terminals (AC or DC+/DC−), then the isolator switch T or T' is in the open state.

The AC transmission terminal AC is part of the vehicle electrical system. The AC transmission terminal AC is connected to the phase terminals PS1-3 of the inverter WR. If power is supplied from the AC transmission terminal AC to the vehicle electrical system, then the inverter operates as a converter for converting the AC power into DC voltage for charging the energy store ES. In this mode and in this direction of transmission, the inverter performs the function of a rectifier and possibly the function of a power or current controller or even a voltage regulator.

An optional DC transmission terminal, which can also be used in the circuits of FIGS. 2 and 3, has a positive rail DC+ (corresponding to a positive contact) connected to the phase terminal PS1 (corresponding to a positive output PA1) of a first H-bridge HB1. Further, the negative rail DC+ (corresponding to a negative contact) of the DC transmission terminal is connected to the phase terminal PS2 (corresponding to a further positive output PA2) of a further H-bridge HB2.

In FIG. 2, AC transmission terminal AC has multiple phases connected to connecting points between semiconductor switches HS of the H-bridges HB1-3. The AC transmission terminal AC is connected to the bridge paths BZ1-3 of the H-bridges HB1-3, in particular to a section of the bridge paths BZ1-3 that is in the second side S2 of the inverter WR, directly. In other words, the AC transmission terminal AC is connected to center taps of the H-bridges HB1-3, in particular to the center taps that are in the second side S2 and are connected to the phase terminals only via a semiconductor switch HS. The second side S2 is connected to the electrical machine EM and the AC transmission terminal AC, and the first side S1 is connected to the energy store ES.

In FIG. 3, AC transmission terminal AC is (has multiple phases) connected to the phase current terminals PS1-3 via the windings of the electrical machine EM. A changeover switch T" connects the windings to one another in star configuration in a first switch position and connects the AC transmission terminal AC to the phase terminals PS1-3 via the series-connected windings in a second switch position. The changeover switch T" has three phases and has two individual changeover elements. In the first switch position, these connect two of the three phase windings to the star point.

The third phase winding of the electrical machine is connected to the AC transmission terminal AC (or an individual phase terminal thereof) directly and not via a changeover element. The changeover switch T" does not relate to all the phases of the electrical machine EM or of the terminal AC. One of the three phase terminals of the AC transmission terminal AC (the middle one in FIG. 3) is connected to a star point of the electrical machine EM (permanently), while the other phase terminals of the AC transmission terminal AC are each connected to the electrical machine via a changeover element. If the changeover switch is in the first switching state, as depicted in dashes, the windings of the electrical machine EM (or a respective end thereof) are connected together and a star configuration is obtained for the phase windings of the machine. If the changeover switch is in the second switching state, as depicted by a solid line, the windings are connected in series between the phase terminals PS1-3 of the inverter and the AC transmission terminal AC.

FIGS. 2 and 3 are depicted without a DC transmission terminal. However, the vehicle electrical systems depicted therein can have a DC transmission terminal connected to one or more (or all) phase current terminals PS1-3 of the inverter WR.

To provide a better overview, only FIG. 1 shows a control unit CTRL of the inverter, said control unit possibly also being part of the on-board electrical systems in FIGS. 2 and 3, however. The control unit CTRL actuates the semiconductor switches HS and the bridges HB1-3, as indicated by the double-headed arrows. A superordinate controller can be formed, depending on mode, by a controller UE of the battery in the form of a battery management system, or by a controller UE' that is stationary. The superordinate controller UE or UE' actuates (as indicated by the dashed arrows) the control unit CTRL, in particular by transmitting a setpoint value. The vehicle electrical system can have a reception unit for transmitting signals from stationary components to the control unit CTRL of the vehicle electrical system. The circuits of FIGS. 2 and 3 can also have at least one such controller CTRL, UE or UE'. Further, the control unit CTRL may be connected to the isolator switches T, T' or the changeover switch T" for the purposes of actuation and can actuate different switching states for said switches in different modes of the inverter.

FIGS. 1-3 depict capacitors C21-C23 that each connect a phase terminal PS1-3 (corresponding to a positive output PA1-3 of the inverter WR) to a negative input current terminal EA2 of the inverter WR. All the positive input terminals PE1-3 of the H-bridges HB1-3 are connected to positive output terminals PA1-3 of the H-bridges HB1-3. These are in turn connected to positive input current terminal EA1 of the inverter WR. All the negative input terminals NE1-3 of the H-bridges HB1-3 are connected to the negative input terminals NA1-3 of the H-bridges HB1-3. These are in turn connected to negative output terminal EA2. The positive input current terminal EA1 and the negative input current terminal EA2 (or all the positive and all the negative input terminals of the H-bridges HB1-3) have a capacitor C1 connected between them.

The invention claimed is:

1. A vehicle electrical system having an inverter, comprising:
    an electrical energy store;
    an electrical machine; and
    an AC transmission terminal, wherein
        the inverter has a first side and a second side and is configured to transmit power between the first side and the second side,
        the first side of the inverter is connected to the energy store via a positive and a negative input current terminal of the inverter;
        the second side of the inverter is connected to the electrical machine via at least two phase current terminals of the inverter, and
        the inverter has at least two H-bridges, each of the H-bridges bypassing the two sides of the inverter, the AC transmission terminal being connected to the second side of the inverter.

2. The vehicle electrical system as claimed in claim 1, wherein the AC transmission terminal is connected to at least one of the phase current terminals directly or is connected to at least one of the phase current terminals indirectly via the electrical machine.

3. The vehicle electrical system as claimed in claim 2, wherein the AC transmission terminal is connected to the phase current terminals directly and the phase current terminals are connected to the electrical machine via an isolator switch.

4. The vehicle electrical system as claimed in claim 2, wherein the AC transmission terminal is connected to the phase current terminals indirectly via the electrical machine.

5. The vehicle electrical system as claimed in claim 1, wherein the AC transmission terminal is connected to the phase current terminals directly and the phase current terminals are connected to the electrical machine via an isolator switch.

6. The vehicle electrical system as claimed in claim 1, wherein the AC transmission terminal is connected to the phase current terminals indirectly via the electrical machine.

7. The vehicle electrical system as claimed in claim 6, wherein the AC transmission terminal is connected to the electrical machine via a changeover switch that in a first state connects windings of the electrical machine to one another and in a second state connects said windings to the AC transmission terminal.

8. The vehicle electrical system as claimed in claim 1, wherein the H-bridges of the inverter have a respective arm on the first and the second side of the inverter, which arm connects the positive input current terminal to the negative input current terminal by means of two series semiconductor switches connected via a connecting point, and the AC transmission terminal is connected to the connecting points of the arms that are on the second side.

9. The vehicle electrical system as claimed in claim 1, wherein the H-bridges of the inverter each have two arms connecting the positive input current terminal to the negative input current terminal by two series semiconductor switches and wherein the semiconductor switches of each arm are connected to one another at connecting points, the two connecting points of each H-bridge further being connected to one another by an inductance.

10. The vehicle electrical system as claimed in claim 1, which further has a DC transmission terminal having a positive and a negative rail, the positive rail being connected to one of the phase terminals and the negative rail being connected to another of the phase terminals or to the negative input terminal.

* * * * *